Oct. 24, 1950     H. H. VICKERS     2,527,204
MANUFACTURE OF INNER TUBES
Filed Jan. 2, 1947
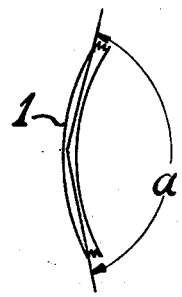  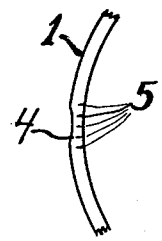
FIG.-1     FIG.-1a     FIG.-1b
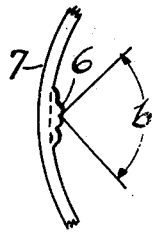 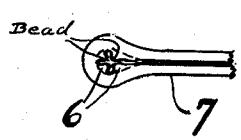 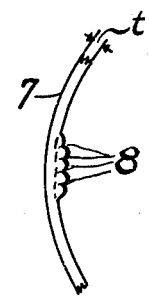
FIG.-2     FIG.-2a     FIG.-2b
   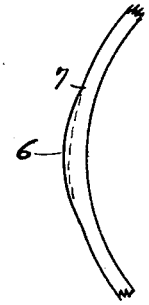
FIG.-3    FIG.-4    FIG.-5    FIG.-6
Herbert H. Vickers Inventor
By P. L. Young Attorney Patented Oct. 24, 1950

2,527,204

UNITED STATES PATENT OFFICE 2,527,204

MANUFACTURE OF INNER TUBES

Herbert H. Vickers, Union, N. J., assignor to Standard Oil Development Company, a corporation of Delaware Application January 2, 1947, Serial No. 719,714

3 Claims. (Cl. 154—14)

This invention pertains to the manufacture of inner tubes and particularly to inner tubes made from Butyl rubber.

Methods and machines for the automatic splicing of inner tubes are disclosed in U. S. Patents No. 2,024,577; 2,024,578; 2,040,466; 2,272,881 and 2,273,463. In practicing the inventions of the above enumerated patents, two ends of the inner tube stock are clamped flat in a pair of alined clamping devices, and while so held, said ends are cut off transversely and heated. Thereafter the freshly cut ends are brought forcibly together and joined preparatory to inflation and vulcanization.

The above-mentioned methods and machines are, in general, highly satisfactory for making inner tubes of natural rubber since inner tube compositions prepared from natural rubber are extremely pliable, have a high degree of tack strength and are easy to flatten completely in the clamps.

Copolymers of a major proportion of an isoolefin such as isobutylene and a minor proportion of a multiolefin such as butadiene or isoprene prepared at low temperatures in the presence of Friedel-Crafts catalysts as described in U. S. Patent No. 2,356,128 dated August 22, 1944 by Thomas and Sparks have been known in the art under the designation of GR–I type rubber and have been found to be vastly superior to natural rubber as a gas barrier and therefore superior as inner tube stock material since tires having inner tubes made thereof require inflation much less frequently. This is particularly true of the GR–I type rubber known as Butyl rubber. It has been found, however, that it is extremely difficult to manufacture inner tubes of Butyl rubber by the above-mentioned methods and machines without forming a large number of defective tubes or rejects. Properties which contribute to this difficulty are the resistance to flattening of the folded tube causing the formation of a hollow core within the flattened tube folds and a tendency to crack at the tube folds.

It is the object of this invention to prepare inner tubes from GR–I or Butyl rubber which are free from defects attributable to hollow core formation at the flattened tube folds and which are relatively free from crack damage at the tube folds.

These and other objects will appear more clearly from the detailed specification and claims which follow.

It has now been found that defective splices in inner tubes manufactured from GR–I or Butyl rubber particularly defects at the flattened tube folds and crack damage at the tube folds can be eliminated by the addition of beads or ridges along the wall of the extruded tube. Use of a beaded rib in the tube at the points of fold serves to thicken this vital section of the tube wall and to give the tube a solid core around which to bend when the tube is flattened preparatory to splicing. The ribs are also designed to reduce the degree of bend at the most serious place and to distribute the bend over a larger section of the tube's circumference. The thickened wall section at the fold also serves to present a larger area for splicing at what is normally a weak point in the splice, and in addition, this larger area serves to take care of a small amount of misalignment of the tube ends during splicing and permits a slight amount of fold cracking without reducing the nominal wall thickness.

Reference is made to the accompanying drawing wherein several embodiments of the present invention are illustrated. In the drawings, Figure 1 is a cross section of a part of an ordinary tube wall showing the degree of bend necessary to bring the folded tube wall to a flattened condition.

Figures 1a and 1b are cross sections of the same tube flattened and reopened respectively, showing the damage to the nominal inner tube wall thickness by the fold cracks.

Figure 2 is a cross section of a part of an inner tube wall having a thickened portion or bead thereon in accordance with the present invention and showing the reduced degree of bend necessary at the same point to bring the tube wall into a flattened condition.

Figures 2a and 2b are cross sections of the tube of Figure 2 in flattened condition and after reopening respectively.

Figures 3, 4, 5 and 6 are cross sections through portions of inner tube having various types of beads extruded on the tube wall in accordance with the present invention.

As shown in Figure 1, an ordinary tube wall 1 will, particularly in the case of automobile tubes of medium to large sizes, be bent through an angle $a$ of almost 180° before it is brought to a flattened condition. When flattened, the outer fibers 2 of the tube are stretched while the inner fibers 3 of the tube are displaced so that on opening the fold as by inflating the tube, cracks 5 occur in the rubber at the inside of the fold while a permanent stretch is imparted to the outer surfaces of the fold causing an indentation 4 in the outer surface of the tube. The net result of these two effects is a substantial thinning of the tube wall at the folded portion.

As shown in Figure 2, however, when a bead or rib 6 is extruded on the inner tube wall 7, the tube wall need only be bent at any one point through an angle b of about 90° to bring it to a flattened condition as shown in Fig. 2a. It may also be seen by comparing Figure 2a and Figure 1a that the radius of curvature at the fold is substantially zero in the case of the flattened ordinary tube wall while there is a substantial radius of curvature when a bead or rib is present on the tube wall. This reduces very materially the stretching of the outer fibers of the tube wall and the attendant permanent stretch while such cracks 8 as are formed by the displacement of the inner fibers of the tube occur almost exclusively in the bead and consequently do not reduce or damage the nominal wall thickness t.

It will be obvious that the bead or rib on the inner tube wall can take a variety of shapes. A few such forms are illustrated in Figures 3, 4, 5 and 6. The essential characteristics of any bead formed on the tube wall are that they provide a substantial radius of curvature to the tube wall at the fold and that they must be of sufficient thickness to absorb substantially completely cracks on the inside of the wall.

The beads or ridges are located on either side of the tube at the points where the folds occur during splicing and are preferably extruded along the full length of the tube. This may readily be done by giving the die-head of the tubing machine or extruder the appropriate shape. Instead of forming the bend integral with the tube during the extrusion of the tube stocks, the bead may be formed separately and secured to the tube stocks by means of rubber cement or the like. In the latter case, the beads need only be long enough to protect that portion of the tube which is clamped in the tube splicing machine.

The following example is illustrative of the present invention:

*Example*

A 600 x 16 passenger car size inner tube made from a Butyl rubber stock and having a nominal wall thickness of 0.060 inch was built up by securing four molded ribs such as are shown in Fig. 2 at diametrically opposite points on the inner walls of the tube. The three V-shaped valleys between the four beads had a slope of about 45° and formed a 90° angle at the apex. The two outer slopes of the bead to the tube wall were $\frac{5}{32}$" long. The minimum wall thickness at the center of the beaded portion was 0.080 inch while the maximum wall thickness at the beaded portion was 0.120 inch. The tubes were then spliced in the usual manner in a tube splicing machine like that shown in U. S. Patent No. 2,273,463.

There was practically no indication of fold breakdown or cracking in the folded portion after the samples had been spliced, formed and cured. A slight misalignment, which is quite common in these splices, occurred in one of these splices but was found to be compensated for by the thickening of the tube by the beads at the folds.

The foregoing description discloses a simple means for reducing or minimizing fold damage in the splicing of inner tubes. While the provision of beads on the tube walls at the point of fold is particularly effective in the elimination of fold damage in the manufacture of Butyl rubber inner tubes, it will be understood that such beads can be applied to any inner tube stock to increase the radius of curvature at the tube folds and thereby minimize fold damage.

The foregoing description contains a limited number of embodiments of the present invention. It will be understood, however, that the invention is not limited to the specific embodiments shown, since numerous variations are possible without departing from the scope of the following claim.

What I claim and desire to secure by Letters Patent is:

1. In the manufacture of rubber composition inner tubes, the improvement which comprises providing a bead at diametrically opposite sides of the inner tube wall, flattening said inner tube wall in a direction substantially perpendicular to the diameter between said beads, and joining the flattened ends of the tube stock to form an inner tube.

2. In the manufacture of tire inner tubes from a rubbery copolymer of a major proportion of isobutylene and minor proportion of a multi-olefin, the improvement which comprises extruding beads at diametrically opposite sides of an inner tube stock, cutting said stock to a pre-determined length, aligning the ends of the cut stock and flattening them around the diametrically opposite beads, and splicing the aligned, flattened ends in heated condition to form an inner tube.

3. In the manufacture of inner tubes from a rubbery copolymer of a major proportion of isobutylene and a minor proportion of isoprene, the improvement which comprises providing a bead at diametrically opposite sides of the inner tube wall, flattening said inner tube wall in a direction substantially perpendicular to the diameter between said beads and joining the flattened ends of the tube stock to form an inner tube.

HERBERT H. VICKERS.

REFERENCES CITED

The following references are of record in the file of this patent:

UNITED STATES PATENTS

| Number | Name | Date |
|---|---|---|
| 467,015 | Newkirk | Jan. 12, 1892 |
| 1,340,703 | Dech | May 18, 1920 |
| 1,444,911 | Goodenberger | Feb. 13, 1923 |
| 1,521,879 | Glickert | Jan. 6, 1925 |
| 1,661,069 | Hartung | Feb. 28, 1928 |
| 2,014,129 | Eger | Sept. 10, 1935 |
| 2,017,582 | Brittain | Oct. 15, 1935 |
| 2,024,577 | Haase | Dec. 17, 1935 |
| 2,168,288 | Fischer | Aug. 1, 1939 |
| 2,186,286 | Engler et al. | Jan. 9, 1940 |
| 2,194,341 | Voorhees | Mar. 19, 1940 |
| 2,254,596 | Breth et al. | Sept. 2, 1941 |
| 2,273,463 | Campbell et al. | Feb. 17, 1942 |
| 2,388,297 | Slaughter | Nov. 6, 1945 |

FOREIGN PATENTS

| Number | Country | Date |
|---|---|---|
| 208,668 | Great Britain | of 1923 |

OTHER REFERENCES

Pearson, "Pneumatic Tires" of 1922 (India Rubber Pub. Co.), page 727. Copy in Div. 45.